UNITED STATES PATENT OFFICE 2,316,774

TREATMENT OF FATTY SUBSTANCES

Russell F. Dunmire and James A. Camelford, Cleveland, Ohio, assignors to The Buckeye Laboratories, Inc., a corporation of Ohio No Drawing. Application September 6, 1941, Serial No. 409,860

5 Claims. (Cl. 260—412.5)

Our invention is directed to the process for treating, purifying, and re-refining fatty substances of the class consisting of oils and waxes and preferably vegetable substances of the class consisting of oils and waxes and more particularly to palm oil used in steel mills for cold rolling of steel strips and in the tin plating of steel strips.

In the cold rolling of steel, streams of oil such, for example, as palm oil, are directed on the steel strips together with large volumes of cooling water. The used oil, together with the water, is then drained into a collection system comprising basins and tanks located in the basement of the mill where separation occurs and the palm oil forms a sludge containing a large percentage of water. The material which is treated is this emulsion or sludge.

The sludge may contain many small solid particles such as steel chips, solid carbonaceous matter, sand and other materials which may be readily removed by screening or by other suitable means. Besides the solid particles, the sludge contains soluble metallo-organic contaminants of a relatively low molecular weight and soluble metallo-organic contaminants of a relatively high molecular weight and the polymers thereof. The contaminants of the low molecular weight may comprise acetic acid, propionic acid, butyric acid, and valeric acid and their esters and metallic salts of these acids and of their isomers. The contaminants of the relatively high molecular weight may comprise compounds of the type which may be represented generically by the formula:

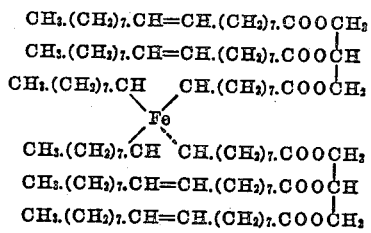

In addition to the above mentioned contaminants, the used or contaminated oil may contain the iron or metallic soaps of the normally occurring fatty acids in the palm oil and the condensation products of the unsaturated fatty acids and of their glycerides.

An object of our invention is to pre-condition the fatty substances prior to subjecting them to a re-refining process utilizing a combined action of adsorption and distillation.

Another object of our invention is to pre-condition the metallo-organic contaminants in the contaminated or used fatty substances before subjecting the contaminated or used fatty substances to a re-refining process utilizing a combined action of adsorption and distillation.

Another object of our invention is to catalytically precipitate the metal portion of the metallo-organic contaminants in the form of oxides and hydroxides to render same readily adsorbable by the adsorption action in the re-refining process and to liberate the organic portion of the metallo-organic contaminants to render the volatile fractions thereof readily removable by the distillation action in the re-refining process.

Another object of our invention is to provide for pre-conditioning the contaminated or used fatty substances by a reagent of the class of oxidizing agents such, for example, as potassium dichromate before subjecting the contaminated or used fatty substances to a re-refining process utilizing a combined action of adsorption and distillation.

Another object of our invention is to pre-condition both the relatively low molecular weight contaminants and the relatively high molecular weight contaminants and the polymers thereof before subjecting the contaminated or used fatty substances to a re-refining process utilizing a combined action of adsorption and distillation.

Another object of our invention is directed to the process of re-refining a contaminated or used fatty substance by first subjecting same to a pre-conditioning operation and then finally subjecting the contaminated or used fatty substances to a process utilizing a combined action of adsorption and distillation.

Other objects and a fuller understanding of our invention may be had by referring to the following description and claims:

In carrying out our process, the fatty substances or the sludge is transferred from the collection system in the basement of the mill to a suitable reaction vessel or container which is equipped with a mechanical agitator and which is arranged to be evacuated by any suitable means. The reaction vessel or container is also arranged to be heated for the purpose of carrying out the process. In other words, the reaction vessel or container comprises a retort provided with a mechanical agitator and is connected to a condensate receiver to carry out fractional distillation involved in the re-refining process. To the contaminated or used fatty substances or palm oil we add a reagent of the class of oxidizing agent such, for example, as potassium dichromate. The combined mixture of the potassium dichromate and the contaminated or used fatty substances is mechanically mixed in the retort under vacuum while the retort is heated to drive off substantially all of the water. The potassium dichromate is added to the contaminated or used fatty substances or palm oil in solution form in order to obtain intimate contact between the potassium dichromate and the contaminated or used fatty substances or palm oil. The vacuum may range from 28 inches to 30 inches of mercury as referred to a 30 inch barometer at sea level. The heating of the mixture of the potassium dichromate and the contaminated or used fatty substances or palm oil is continued until substantially all of the water has been evaporated and in this heating operation the temperature may be maintained at a value in the neighborhood of 250 degrees F., although lower or higher temperatures may be used because the main object is to provide enough heat to take care of the latent heat of evaporation of the water contained in the mixture. The concentration of the potassium dichromate is not critical within wide limits although we prefer to employ between 1% and 5% of the weight of the fatty substances or palm oil contained in the sludge. Any excess of solid oxidation agent present may be readily removed by filtration. The mechanical agitation is continued while the heating operation is carried out to remove the water.

The potassium dichromate oxidizes the iron present in the ferrous form to the ferric form and then catalytically promotes the precipitation of the metal portion of the metallo-organic contaminants in the form of oxides and hydroxides to render same readily adsorbable by the adsorption action in the re-refining process and the liberation of the organic portion of the metallo-organic contaminants to render the volatile fraction thereof readily removable by the distillation action in the re-refining process. The potassium dichromate chemically conditions the relatively low molecular weight metallo-organic contaminants by separating the metal portion thereof in the form of low molecular weight compounds to render same readily adsorbable by the adsorption action in the re-refining process and by releasing the organic portion thereof to render the same readily removable by the distillation action in the re-refining process and chemically conditions the relatively high molecular weight metallo-organic contaminants and the polymers thereof by separating the metal portion thereof in the form of low molecular weight compounds to render same readily adsorbable by the adsorption action in the re-refining process and by releasing the organic portion thereof to render the volatile fraction thereof readily removable by the distillation action in the re-refining process. The reaction between the potassium dichromate and the contaminated or used fatty substances or the palm oil is best obtained under vigorous mechanical agitation and under relatively high temperatures in the neighborhood of 250 degrees F. Under these conditions good physical and chemical relationships exist between the potassium dichromate and the contaminated or used fatty substances or palm oil.

Up to the present point, the process so far described may be referred to as a pre-conditioning process after which the contaminated fatty substances or palm oil is now ready for a re-refining process utilizing a combined action of adsorption and distillation. The portion of the process which will now be described may be referred to as the re-refining process. In carrying out the re-refining process, we add to the mixture of the potassium dichromate and the contaminated or used fatty substances or palm oil a supply of solid adsorbent material in the retort or sealed container. The amount of the solid adsorbent material which is added to the retort chamber may vary with the particular type of fatty substance being treated and the process should be carried out under a sufficient amount of solid adsorbent material to effectively adsorb all of the adsorbable materials and impurities in the contaminated or used fatty substances or palm oil. The solid adsorbent material may comprise bone char, carbon black, fuller's earth, etc. The combined mixture of the potassium dichromate, the contaminated or used fatty substances or palm oil and the adsorbent material is vigorously agitated by mechanical means in the retort under a vacuum preferably in the range of 28 inches to 30 inches of mercury as referred to a 30-inch barometer at sea level. The temperature may vary in a range which extends up to a value at substantially 400 degrees F. to drive off the volatile impurities and preferably the temperature may vary in a range between 250 degrees to 400 degrees F. In the case of palm oil, we have found that treatment at temperatures in excess of a value substantially at 400 degrees F. leads to discoloration of the final product and also reduces the yield because of the decomposition of the unsaturated acids and esters. At temperatures below the value substantially at 400 degrees F. the yield is good but as the temperature substantially exceeds the value at substantially 400 degrees F. the yield rapidly decreases rendering the process uneconomical. The mechanical agitation or stirring of the combined mixture of the potassium dichromate, the contaminated or used fatty substances or palm oil, and the adsorbent material in the sealed container brings all of the constituents thereof in close intimate physical contact and the adsorbent material thereby adsorbs the substantially non-volatile impurities. The heating of the retort drives off the volatile impurities by distillation. The final mass in the retort after the heating and stirring is finished is then removed from the retort and filtered by any suitable means. The filtering separates the adsorbent material with the adsorbed impurities from the fatty substances or palm oil being treated to recover the latter. The filter also removes any solid precipitated particles.

The time of the agitation may vary from 15 minutes to one hour depending upon the temperatures employed in the re-refining process, the amount of adsorbent material employed, and the degree to which the fatty substances or palm oil has been contaminated.

The term "contaminated" as used herein and also in the claims means an oil or wax which is unfit for a specific purpose.

The table below gives the comparisons of the properties of four samples of palm oil. The first column gives the normal purchase specifications for new palm oil intended for steel mill use; the second column shows the properties of palm oil after it has been used in the cold rolling of steel, and from which the water and solid impurities have been removed; the third column shows the properties of a sample of the same oil as in the second column which has been subjected to a process of re-refining consisting of adsorption and fractional distillation under vacuum; and the fourth column shows the properties of a sample of the same oil as in the second column which has been subjected to a process of pre-conditioning as disclosed above, followed by a process of re-refining consisting of adsorption and fractional distillation under vacuum:

| Property | New palm oil | Contaminated palm oil | Contaminated palm oil re-refined | Contaminated palm oil pre-conditioned and re-refined |
|---|---|---|---|---|
| Specific gravity 15° C | .921 | .928 | .932 | .924 |
| Iodine No | 45-60 | 36 | 38 | 48 |
| Saponification No | 195-210 | 145 | 162 | 187 |
| Acid No | 8-20 | 25.1 | 23.9 | 22.6 |
| Melting point, °C | 15-24 | 27 | 26 | 22 |
| Ash, per cent | .05-.15 | .78 | .56 | .15 |
| Viscosity S.U.S./210° F | 55 | 69 | 67 | 61 |
| Color | (1) | (2) | (3) | (4) |

1 Yellow to orange.
2 Black.
3 Dark brown.
4 Light brown.

It will be observed the contaminated oil differs radically in several of its properties from new palm oil. These differences are due to the presence of metallo-organic contaminants and to decomposition of several of the constituents of normal palm oil. The decrease in iodine value shows the presence of high molecular weight polymeric substances, and the decrease in saponification value demonstrates the presence of decomposition products and non-saponifiable organo-metallic complexes. The very marked increase in the value of the ash was almost totally due to the presence of ferric oxide, and the increase in viscosity is attributable to the presence of high molecular weight soluble polymers.

After the sample had been subjected to a process of re-refining consisting of adsorption and fractional distillation under vacuum, a general improvement was noted in every characteristic of the contaminated palm oil, but there were marked differences from those of new oil. When, however, a sample of contaminated palm oil was subjected to a process comprising pre-conditioning all of the metallo-organic contaminants present by adding potassium dichromate in aqueous solution and mechanically mixing and heating the same in a sealed container under vacuum to chemically condition the relatively low molecular weight contaminants by separating the metal portion thereof in the form of low molecular weight compounds, specifically the oxides and hydroxides, to render the same readily adsorbable by the adsorption action in the re-refining process, and by releasing the organic portion of the relatively low molecular weight metallo-organic contaminants to render the same readily removable by the distillation action in the re-refining process, and to chemically condition the relatively high molecular weight organo-metallic contaminants and polymers thereof, by separating the metal portions in the form of low molecular weight compounds, specifically the oxides and hydroxides, to render the same readily adsorbable by the adsorption action in the re-refining process, and by releasing the organic portions to render the volatile portions thereof readily removable by the distillation action in the re-refining process, and this pre-conditioning was followed by a re-refining process utilizing a combined action of adsorption and distillation, it will be noted that a product was obtained which was greatly superior in properties to that obtained by the same re-refining process, but where the step of pre-conditioning had not been taken. It will also be noted that this sample very closely resembles new palm oil in all of its properties.

Although we have described our invention with a certain degree of particularity, it is understood that the present disclosure has been made only by way of example and that numerous changes may be resorted to without departing from the spirit and the scope of the invention as hereinafter claimed.

We claim as our invention:

1. In a re-refining process utilizing a combined action of adsorption and distillation for a contaminated or used palm oil which contains soluble metallo-organic contaminants of a relatively low molecular weight and soluble metallo-organic contaminants of a relatively high molecular weight and polymers thereof, the steps of pre-conditioning the metallo-organic contaminants in the palm oil before subjecting the contaminated or used palm oil to the combined action of adsorption and distillation, comprising, adding potassium dichromate to the contaminated or used palm oil and agitating and heating the same in a sealed container under vacuum to chemically condition the relative low molecular weight metallo-organic contaminants by separating the metal portion thereof in the form of low molecular weight compounds to render same readily adsorbable by the adsorption action in the re-refining process and by releasing the organic portion thereof to render the same readily removable by the distillation action in the re-refining process and to chemically condition the relative high molecular weight metallo-organic contaminants and the polymers thereof by separating the metal portion thereof in the form of low molecular weight compounds to render same readily adsorbable by the adsorption action in the re-refining process and by releasing the organic portion thereof to render the volatile fractions thereof readily removable by the distillation action in the re-refining process.

2. The process for removing impurities from a contaminated or used palm oil comprising the steps of adding a solution of potassium dichromate to the contaminated or used palm oil, mechanically agitating the potassium dichromate and the contaminated or used palm oil in a sealed container to thoroughly mix same, heating the mixture of the potassium dichromate and the contaminated or used palm oil in the sealed container under vacuum until substantially all the water is driven off, adding a solid adsorbent material to the mixture of the potassium dichromate and the contaminated or used palm oil, mechanically mixing and agitating the combined mixture of the potassium dichromate, the contaminated or used palm oil and the adsorbent material in the sealed container to absorb the substantially non-volatile impurities, heating the said combined mixture of the potassium dichromate, the contaminated or used palm oil and the adsorbent material in the sealed container under vacuum at a temperature in a range which extends up to a value at substantially 400 degrees F. to drive off the volatile impurities, and separating the adsorbent material with the adsorbed impurities from the palm oil being treated to recover the latter.

3. The process for removing impurities from a contaminated or used palm oil comprising the steps of adding a solution of potassium dichromate to the contaminated or used palm oil, agitating the potassium dichromate and the contaminated or used palm oil in a sealed container to thoroughly mix same, heating the mixture of the potassium dichromate and the contaminated or used palm oil in the sealed container under vacuum until substantially all the water is driven off, adding a solid adsorbent material to the mixture of the potassium dichromate and the contaminated or used palm oil, agitating the combined mixture of the potassium dichromate, the contaminated or used palm oil and the adsorbent material in the sealed container to adsorb the substantially non-volatile impurities, heating the said combined mixture of the potassium dichromate, the contaminated or used palm oil and the adsorbent material in the sealed container under vacuum to drive off the volatile impurities, and separating the adsorbent material with the adsorbed impurities from the palm oil being treated to recover the latter.

4. In a re-refining process utilizing the steps of distillation and adsorption for a contaminated or used palm oil which contains soluble metallo-organic contaminants, the steps of pre-conditioning the metallo-organic contaminants in the contaminated or used palm oil before subjecting the contaminated or used palm oil to the re-refining process, comprising, adding potassium dichromate to the contaminated or used palm oil and agitating and heating the same in a sealed container under vacuum to precipitate the metal portion of the metallo-organic contaminants in the form of oxides and hydroxides and to liberate the organic portion of the metallo-organic contaminants to render the volatile fractions thereof readily removable by the distillation action in the re-refining process and to render the precipitated oxides and hydroxides readily removable by the adsorption action in the re-refining process, said re-refining process comprising the steps of adding a solid adsorbent material to the mixture of the potassium dichromate and the contaminated or used palm oil, agitating the combined mixture of the potassium dichromate, the contaminated or used palm oil and the adsorbent material in a sealed container to adsorb the precipitated oxides and hydroxides and other impurities, heating the said combined mixture in the sealed container under vacuum to distill off the volatile fractions of the liberated organic portion of the metallo-organic contaminants, and separating the adsorbent material and the impurities from the palm oil being treated by filtration to recover the latter.

5. In a re-refining process utilizing the steps of distillation and adsorption for a palm oil sludge which contains water and soluble metallo-organic contaminants, the steps of pre conditioning the metallo-organic contaminants in the palm oil sludge before subjecting the palm oil sludge to the re-refining process, comprising, adding potassium dichromate to the palm oil sludge and agitating and heating the same in a sealed container under vacuum to dehydrate the palm oil sludge and to separate the metal portion of the metallo-organic contaminants in the form of a precipitate to render same readily removable by the adsorption action in the re-refining process, said re-refining process comprising the steps of adding a solid adsorbent material to the mixture of the potassium dichromate and the dehydrated palm oil sludge, agitating the combined mixture of the potassium dichromate, the dehydrated palm oil sludge and the adsorbent material in a sealed container to adsorb the said precipitate and other impurities, heating the said combined mixture in the sealed container under vacuum to distill off the low boiling point volatile impurities, and separating the adsorbent material and the impurities from the palm oil by filtration to recover the latter.

RUSSELL P. DUNMIRE.
JAMES A. CAMELFORD.